(12) United States Patent
Fujita et al.

(10) Patent No.: US 8,220,061 B2
(45) Date of Patent: Jul. 10, 2012

(54) METHOD FOR MAKING CONTENTS PUBLIC OR PRIVATE, INFORMATION PROVIDING SYSTEM, AND INFORMATION PROVIDING PROGRAM

(75) Inventors: Takeshi Fujita, Ichikawa (JP); Tsutomu Kawachi, Tokyo (JP)

(73) Assignee: Sony Corporation, Tokyo (JP)

( * ) Notice: Subject to any disclaimer, the term of this patent is extended or adjusted under 35 U.S.C. 154(b) by 1031 days.

(21) Appl. No.: 11/814,325

(22) PCT Filed: May 11, 2005

(86) PCT No.: PCT/JP2005/008630
§ 371 (c)(1),
(2), (4) Date: Nov. 13, 2007

(87) PCT Pub. No.: WO2006/077660
PCT Pub. Date: Jul. 27, 2006

(65) Prior Publication Data
US 2009/0025086 A1    Jan. 22, 2009

(30) Foreign Application Priority Data

Jan. 20, 2005    (JP) ................................. 2005-012664

(51) Int. Cl.
*G06F 21/00* (2006.01)
(52) U.S. Cl. ............................... 726/27; 726/25; 726/26
(58) Field of Classification Search .................. None
See application file for complete search history.

(56) References Cited

U.S. PATENT DOCUMENTS

| 5,930,801 | A  |   | 7/1999  | Falkenhainer et al. |
| 6,038,563 | A  | * | 3/2000  | Bapat et al. ........................... 1/1 |
| 6,938,079 | B1 | * | 8/2005  | Anderson et al. ............. 709/222 |
| 6,947,557 | B1 | * | 9/2005  | Megiddo et al. ................ 380/30 |
| 2002/0112162 | A1 | * | 8/2002 | Cocotis et al. ................ 713/176 |
| 2003/0135761 | A1 |   | 7/2003 | Mimura et al. |
| 2003/0212895 | A1 | * | 11/2003 | Kisliakov ..................... 713/185 |

FOREIGN PATENT DOCUMENTS

| JP | 11-003265   | 1/1999 |
| JP | 2001-117800 | 4/2001 |
| JP | 2002-149553 | 5/2002 |
| JP | 2003-242034 | 8/2003 |
| JP | 2004-213353 | 7/2004 |

* cited by examiner

*Primary Examiner* — Nasser Goodarzi
*Assistant Examiner* — Ghazal Shehni
(74) *Attorney, Agent, or Firm* — K&L Gates LLP

(57) ABSTRACT

Contents can be made public or private, when to be switched so, by designating a common file identifier before and after the switching. An information providing system reads a second file identifier related to a first file identifier, from a storage device (S25). The information providing system moves, in case it receives a request for making the contents public, the contents corresponding to the second file identifier read, to a public area, and moves, in case it receives a request for making the contents private, the same to a private area (S30). According to the stored place of the contents moved, the information providing system changes the second file identifier, and stores the same in the storage device in a correlation between the first file identifier received and the second file identifier changed (S35).

6 Claims, 7 Drawing Sheets

PUBLIC/PRIVATE SETTING SCREEN

TERMINAL DEVICE

USER INFORMATION DATABASE

| USER IDENTIFIER |
|---|
| user001 |
| user002 |
| ⋮ |

FIG. 5

MANAGEMENT DATABASE

| FIRST FILE IDENTIFIER | SECOND FILE IDENTIFIER | PUBLIC FLAG |
|---|---|---|
| /dir-001/file-001 | http://www.algeb.com/public/aaa.html | PUBLIC |
| /dir-002/file-002 | http://www.algeb.com/private/bbb.html | PRIVATE |
| ⋮ | ⋮ | ⋮ |

PUBLIC/PRIVATE SETTING SCREEN

MANAGEMENT DATABASE

| FIRST FILE IDENTIFIER | SECOND FILE IDENTIFIER | PUBLIC FLAG |
|---|---|---|
| /dir-001/file-001 | http://www.algeb.com/private/aaa.html | PRIVATE |
| /dir-002/file-002 | http://www.algeb.com/private/bbb.html | PRIVATE |
| ⋮ | ⋮ | ⋮ |

METHOD FOR MAKING CONTENTS PUBLIC OR PRIVATE, INFORMATION PROVIDING SYSTEM, AND INFORMATION PROVIDING PROGRAM

FIELD OF THE INVENTION

The present invention relates to a method of making contents public or private.

BACKGROUND ART

Conventionally, there has been disclosed a management device of web contents for managing the contents, such as initiation or termination of publication of the contents, or replacement of the contents, on a web site of the Internet (for example, see Patent Document 1).

The management device of the web contents is characterized in that, for example, it has a private region inaccessible externally through a communication network and a public region accessible externally as regions for storing the contents, stores the registered content in the private region, copies the content from the private region to the public region when a period of initiating publication of the content is reached based on given publication schedule information, and deletes the content from the public region when a period of terminating publication of the content is reached based on the publication schedule information.

However, in the above-described conventional example, upon switching the content status between public and private, it has been impossible to make the content public or private by specifying the same file identifier before and after the switching. This is because different file identifiers are used for identifying the content before and after switching the status between public and private. For example, in the case where the private region is designated as "/private" and the public region is designated as "/public", and when the content corresponding to the file identifier "/private/aaa.html" is made public, the file identifier is changed to "/public/aaa.html".
Patent Document 1: Japanese Unexamined Patent Publication (Kokai) No. 2002-149553

DISCLOSURE OF THE INVENTION

Problems to be Solved by the Invention

The present invention is intended to eliminate such disadvantages of the conventional example, and particularly to enable to make content public or private by specifying the same file identifier before and after switching the content status between public and private.

Means for Solving the Problems

In order to solve the above-described problems, the present invention applies the following configurations.

The present invention is a computer system in which an information providing system for providing contents and a terminal device for browsing the contents are connected to a communication network. In addition, a storage device of the information providing system includes a public region accessible from the terminal device and a private region inaccessible from the terminal device, stores the content in the public or private region, and stores a first file identifier for identifying the content and a second file identifier for identifying the content while associating them with each other.

The terminal device transmits a request for making the content public or private and the first file identifier to the information providing system. Next, the information providing system receives the request for making the content public or private and the first file identifier. Then, the information providing system reads the second file identifier associated with the received first file identifier from the storage device. Subsequently, the information providing system transfers the content corresponding to the read second file identifier to the public region if the request for making the content public is received in the reception processing, or transfers the content corresponding to the read second file identifier to the private region if the request for making the content private is received in the reception processing. Next, the information providing system changes the second file identifier in accordance with a storage location of the transferred content, and stores the received first file identifier and the changed second file identifier in the storage device while associating them with each other.

In another aspect of the present invention, in the computer system, the storage device of the information providing system further stores the first file identifier and a public flag for identifying whether the content is stored in the public or private region while associating them with each other.

The terminal device transmits a request for browsing the content and the first file identifier to the information providing system. Next, the information providing system receives the request for browsing the content and the first file identifier. Then, the information providing system reads the public flag and the second file identifier associated with the received first file identifier from the storage device. Subsequently, the information providing system authenticates a user if the read public flag indicates that the content is stored in the private region. Next, the information providing system dynamically creates display control information based on the content corresponding to the read second file identifier and transmits the information to the terminal device if the user authentication is done successfully, or transmits the display control information on the content corresponding to the second file identifier to the terminal device if the read public flag indicates that the content is stored in the public region. Thereafter, the terminal device receives the display control information and displays the content based on the received display control information.

ADVANTAGE OF THE INVENTION

Since an information providing system transfers content, corresponding to a second file identifier associated with a first file identifier received from a terminal device, to a public or private region, and changes the second file identifier in accordance with a storage location of the transferred content, it is allowed to make the content public or private by specifying the same file identifier (first file identifier) before and after switching the content status between public and private.

BEST MODE FOR CARRYING OUT THE INVENTION

Hereinafter, embodiments of the present invention will be described with reference to the drawings.

FIG. 1 is a block diagram showing an overall configuration of a computer system according to this embodiment.

A terminal device 10 and an information providing system 20 are connected to the Internet 30 as a communication network. Here, although only one terminal device 10 is connected to the Internet 30 in FIG. 1, a plurality of terminal devices 10 may be connected to the Internet 30. In addition, the connection of the terminal device 10 and the information providing system 20 with the Internet 30 may be either wired or wireless.

The terminal device 10 is allowed to browse contents provided by the information providing system 20. The information providing system 20 is allowed to provide the contents to the terminal device 10. The details thereof will be described later.

FIG. 2 shows a configuration of the terminal device 10.

A CPU 12 as a processor, a RAM 13, a ROM 14, and an HDD 19 (Hard Disk Drive) as storage devices, a keyboard 16 and a mouse 17 as input devices, a display 18 as a display device, and an NIC 15 (Network Interface Card) as a communication device are connected to a bus 11. The HDD 19 stores a general web browser program. The CPU of the terminal device 10 is configured to display an HTML (Hyper-Text Markup Language) file or the like as display control information on the contents provided by the information providing system 20 on the display by executing the web browser program.

FIG. 3 shows a configuration of the information providing system 20.

A CPU 22 as the processor, a RAM 23, a ROM 24 and an HDD 26 as the storage devices, and an NIC 25 (Network Interface Card) as the communication device are connected to a bus 21. The HDD 26 includes a public region accessible from the external terminal device 10, "http://www.algeb.com/public", and a private region inaccessible from the external terminal device 10, "http://www.algeb.com/private". In addition, the contents to be provided to the external terminal device 10 are stored in the public or private region. Furthermore, the private region stores an information providing program, a user information database in which user information is stored, and a management database in which management information is stored. The CPU of the information providing system 20 is configured to provide the display control information on the contents or the like to the external terminal device 10 by executing the information providing program.

FIG. 4 shows a structure of the user information database.

The user information database stores a user identifier for identifying a user. The user identifier includes a user ID, a password, and combinations thereof.

FIG. 5 shows a structure of the management database.

The management database stores a first file identifier for identifying the content and a second file identifier for identifying the content while associating them with each other. Here, the first file identifier may be that which uniquely identifies the content, and may be an ID number consisting of numbers, characters, symbols, or combinations thereof. In contrast, although the second file identifier may also be that which uniquely identifying the content, it can desirably be recognized by an OS (Operating System). For example, in a first record of FIG. 5, the first file identifier, "/dir-001/file-001", and the second file identifier, "http://www.algeb.com/public/aaa.html", are stored for a given content while associated with each other.

The management database also stores the first file identifier and a public flag for identifying whether the content is stored in the public or private region while associating them with each other. Here, the public flag is allowed to take either of two values, namely "public" indicating that the content is stored in the public region and "private" indicating that the content is stored in the private region. In the first record of FIG. 5, the first file identifier, "/dir-001/file-001", and "public" indicating that the content is stored in the public region are stored while associated with each other.

Next, operations of the computer system of this embodiment are described.

[Setting of Making Content Public or Private]

FIG. 6 is a flow chart of the terminal device 10 and the information providing system 20 upon performing setting of making the content public or private.

The CPU of the terminal device 10 accepts a given URL (Uniform Resource Locator) corresponding to the information providing system 20 from the keyboard. Based on the accepted URL, the CPU of the terminal device 10 then transmits the request for browsing a public/private setting screen to the information providing system 20 through the web browser (S10).

The CPU of the information providing system 20 receives the request for browsing the public/private setting screen from the terminal device 10. Based on the received browse request, the CPU of the information providing system 20 then transmits the display control information (HTML or the like) on the public/private setting screen to the terminal device 10 (S15).

The CPU of the terminal device 10 receives the display control information on the public/private setting screen from the information providing system 20. Based on the received display control information, the CPU of the terminal device 10 then displays the public/private setting screen on the display through the web browser (S17). Here, FIG. 7 shows a configuration of an example of the public/private setting screen. In this embodiment, the public/private setting screen includes a column for specifying a target content by the first file identifier, radio buttons ("public" and "private") for specifying the request for making the target content public or private, and an OK button.

Subsequently, the CPU of the terminal device 10, upon the OK button being pressed by means of the mouse, accepts the first file identifier input using the keyboard into the column for specifying the target content and the request for making the target content public or private specified by the radio button using the mouse. Then, the CPU of the terminal device 10 transmits the accepted first file identifier and the request for making the content public or private to the information providing system 20 (S20).

The CPU of the information providing system 20 receives the first file identifier and the request for making the content public or private from the terminal device 10 (S22). Then, the CPU of the information providing system 20 reads the second file identifier and the public flag associated with the received first file identifier from the management database (S25). Subsequently, the CPU of the information providing system 20 transfers the content corresponding to the read second file identifier to the public region, "http://www.algeb.com/public", if the request for making the content public is received at Step S22, or transfers the content corresponding to the read second file identifier to the private region, "http://www.algeb.com/private", if the request for making the content private is received (S30).

Then, the CPU of the information providing system 20 changes the second file identifier in accordance with the storage location of the transferred content, and stores the first file identifier and the changed second file identifier in the management database while associating them with each other (S35). Subsequently, the CPU of the information providing system 20 changes the public flag in accordance with the request for making the content public or private, and stores the first file identifier and the changed public flag in the management database while associating them with each other (S40).

For example, if the CPU of the information providing system 20 receives the first file identifier, "/dir-001/file-001", and the request for making the content private, the CPU of the information providing system 20 reads the second file identifier, "http://www.algeb.com/public/aaa.html", and the public flag, "public" associated with the first file identifier from the management database. Then, based on the request for making the content private, the CPU of the information providing system 20 transfers the content corresponding to the read second file identifier, "http://www.algeb.com/public/aaa.html", to the private region, "http://www.algeb.com/private". Subsequently, the CPU of the information providing system 20 changes the second file identifier to "http://www.algeb.com/private/aaa.html" in accordance with the storage location of the transferred content, and stores the first file identifier, "/dir-001/file-001", and the second file identifier, "http://www.algeb.com/private/aaa.html", in the management database while associating them with each other. In addition, the CPU of the information providing system 20 changes the public flag to "private" based on the request for making the content private, and stores the first file identifier, "/dir-001/file-001", and the changed public flag, "private", in the management database while associating them with each other. Here, FIG. 8 shows the management database after the above-described processing has been performed.

According to the foregoing, upon switching the content status between public and private, it is possible to make the content public or private by specifying the same file identifier (first file identifier) before and after the switching. In addition, it is possible to switch the content status between public and private by contents instead of by directories.

[Browsing of Contents]

FIG. 9 is a flow chart of the terminal device 10 and the information providing system 20 upon browsing the contents.

The CPU of the terminal device 10 accepts a given URL corresponding to the information providing system 20 from the keyboard. Based on the accepted URL, the CPU of the terminal device 10 then transmits a request for browsing a contents list screen to the information providing system 20 through the web browser (S50).

The CPU of the information providing system 20 receives the request for browsing the contents list screen from the terminal device 10. Based on the received browse request, the CPU of the information providing system 20 then transmits the display control information (HTML or the like) on the contents list screen to the terminal device 10 (S55). Here, the CPU of the information providing system 20 reads the first file identifier from the management database, and creates the display control information on the contents list screen based on the read first file identifier.

The CPU of the terminal device 10 receives the display control information on the contents list screen from the information providing system 20. Based on the received display control information, the CPU of the terminal device 10 then displays the contents list screen on the display through the web browser (S60). Here, FIG. 10 shows a configuration of an example of the contents list screen. Although the contents list screen is configured to display a list of the first file identifiers in this embodiment, it may display a tree structure of the contents which are layered based on the first file identifiers. In addition, the contents list screen may also include a search function for displaying only those which satisfy search conditions. Furthermore, the first file identifier displayed on the contents list screen is provided with a link for transmitting the first identifier and the request for browsing the content corresponding to the first file identifier to the information providing system 20. For example, the first file identifier, "/dir-001/file-001", displayed on the contents list screen is provided with a link destination specified by "http://www.algeb.com/xxx.cgi?path=/dir-001/file-001".

The CPU of the terminal device 10, upon the first file identifier displayed on the contents list screen being clicked on by means of the mouse, transmits the request for browsing the content and the first file identifier to the information providing system 20 through the web browser based on the link destination provided to the clicked first file identifier (S65).

The CPU of the information providing system 20 receives the request for browsing the content and the first file identifier from terminal device 10. Then, the CPU of the information providing system 20 reads the second file identifier and the public flag associated with the received first file identifier from the management database (S70).

Hereinbelow, the case where the read flag indicates "public" and the case where it indicates "private" are described, respectively.

[The Case where Public Flag Indicates "Public"]

The CPU of the information providing system 20 transmits the display control information (HTML or the like) on the content corresponding to the read second file identifier as it is to the terminal device 10 if the read public flag indicates "public" (S95).

The CPU of the terminal device 10 receives the display control information from the information providing system 20. Based on the received display control information, the CPU of the terminal device 10 then displays the content on the display through the web browser (S100).

[The Case where Public Flag Indicates "Private"]

The CPU of the information providing system 20 transmits the display control information (HTML or the like) on the user authentication screen to the terminal device 10 if the read public flag indicates "private" (S75).

The CPU of the terminal device 10 receives the display control information on the user authentication screen from the information providing system 20. Based on the received display control information, the CPU of the terminal device 10 then displays the user authentication screen on the display through the web browser (S80). Subsequently, the CPU of the terminal device 10 accepts the user identifier, such as the user ID, from the keyboard, and transmits it to the information providing system 20 (S85).

The CPU of the information providing system 20 receives the user identifier from the terminal device 10. Then, if the received user identifier is stored in the user information database, the CPU of the information providing system 20 determines that the user authentication is done successfully, and dynamically creates the display control information (HTML or the like) based on the content corresponding to the second file identifier (S90). Subsequently, the CPU of the information providing system 20 transmits the dynamically created display control information to the terminal device 10 (S95).

The CPU of the terminal device 10 receives the display control information from the information providing system 20. Based on the received display control information, the CPU of the terminal device 10 then displays the content on the display through the web browser (S100).

According to the foregoing, the CPU of the terminal device 10 can issue the request for browsing the content to the information providing system 20 with the same file identifier (first file identifier), regardless of whether the content is stored in the public or private region. For this reason, the CPU of the terminal device 10 can issue the request for browsing the content with the same file identifier (first file identifier)

utilizing a cache of the web browser, regardless of whether the content is stored in the public or private region.

In addition, since the CPU of the information providing system 20 transmits the display control information on the content, as it is, to the terminal device 10 without performing the user authentication if the request for browsing the content stored in the public region has been transmitted from the terminal device 10, a burden of performing the user authentication can be eliminated. Meanwhile, since the CPU of the information providing system 20, upon the request for browsing the content stored in the private region, dynamically creates the display control information on the content and transmits it to the terminal device 10 if the user authentication is done successfully, the security can be ensured.

BRIEF DESCRIPTION OF THE DRAWINGS

FIG. 5 shows a structure of a management database;

Figure 1:
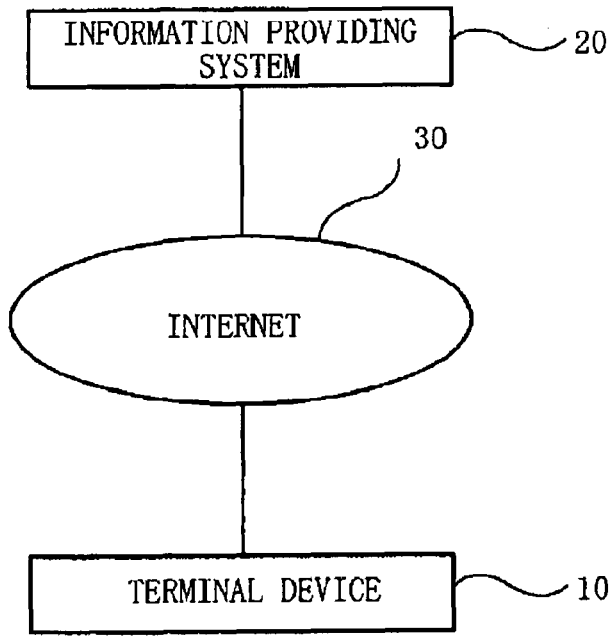
FIG. 1 is a block diagram showing an overall configuration of a computer system.
Figure 2:
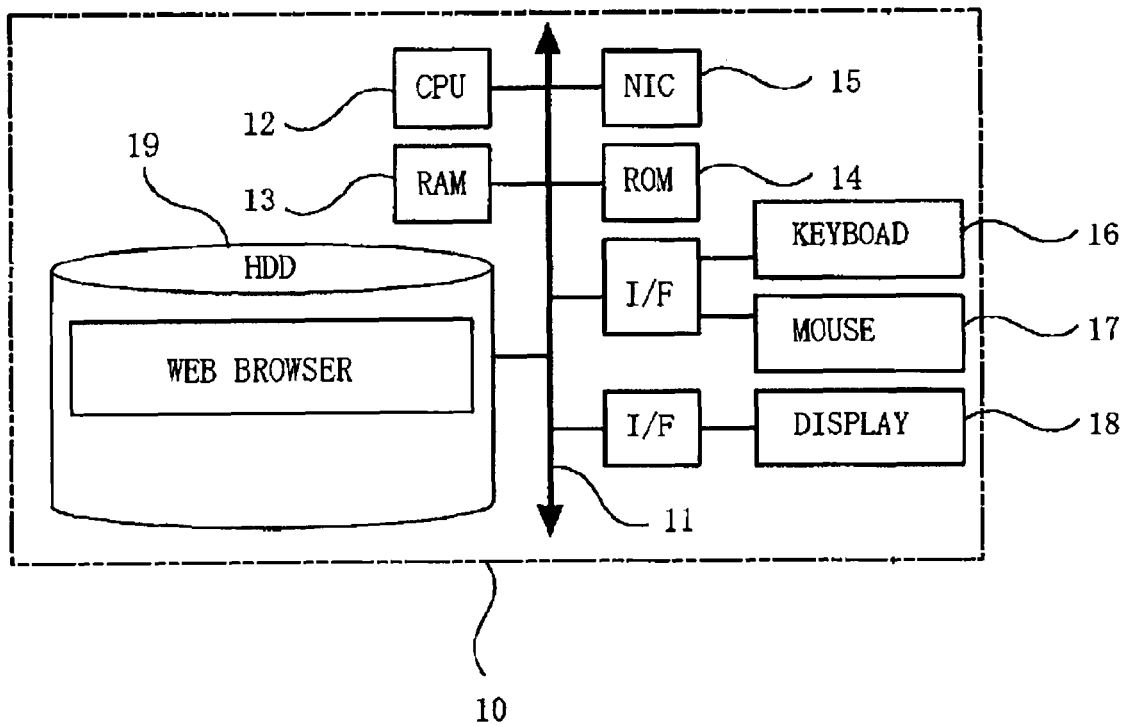
FIG. 2 shows a configuration of a terminal device.
Figures 3, 4:
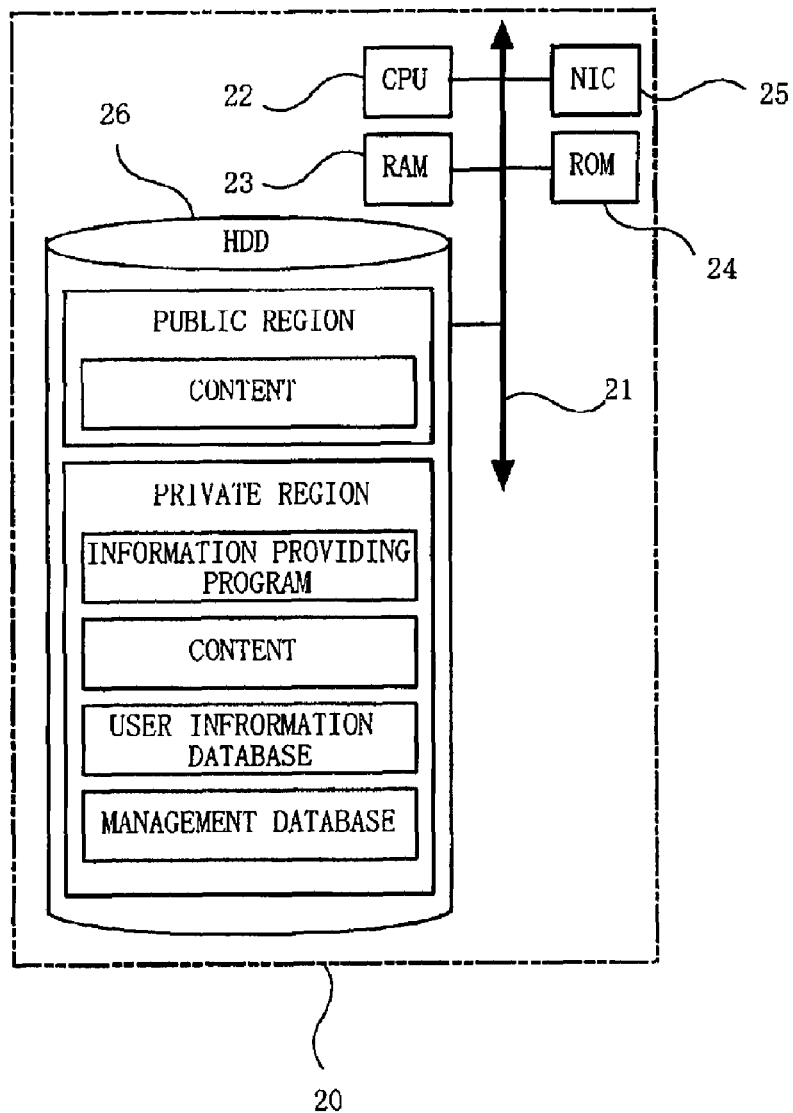
FIG. 3 shows a configuration of an information providing system.
FIG. 4 shows a structure of a user information database.
Figure 6:
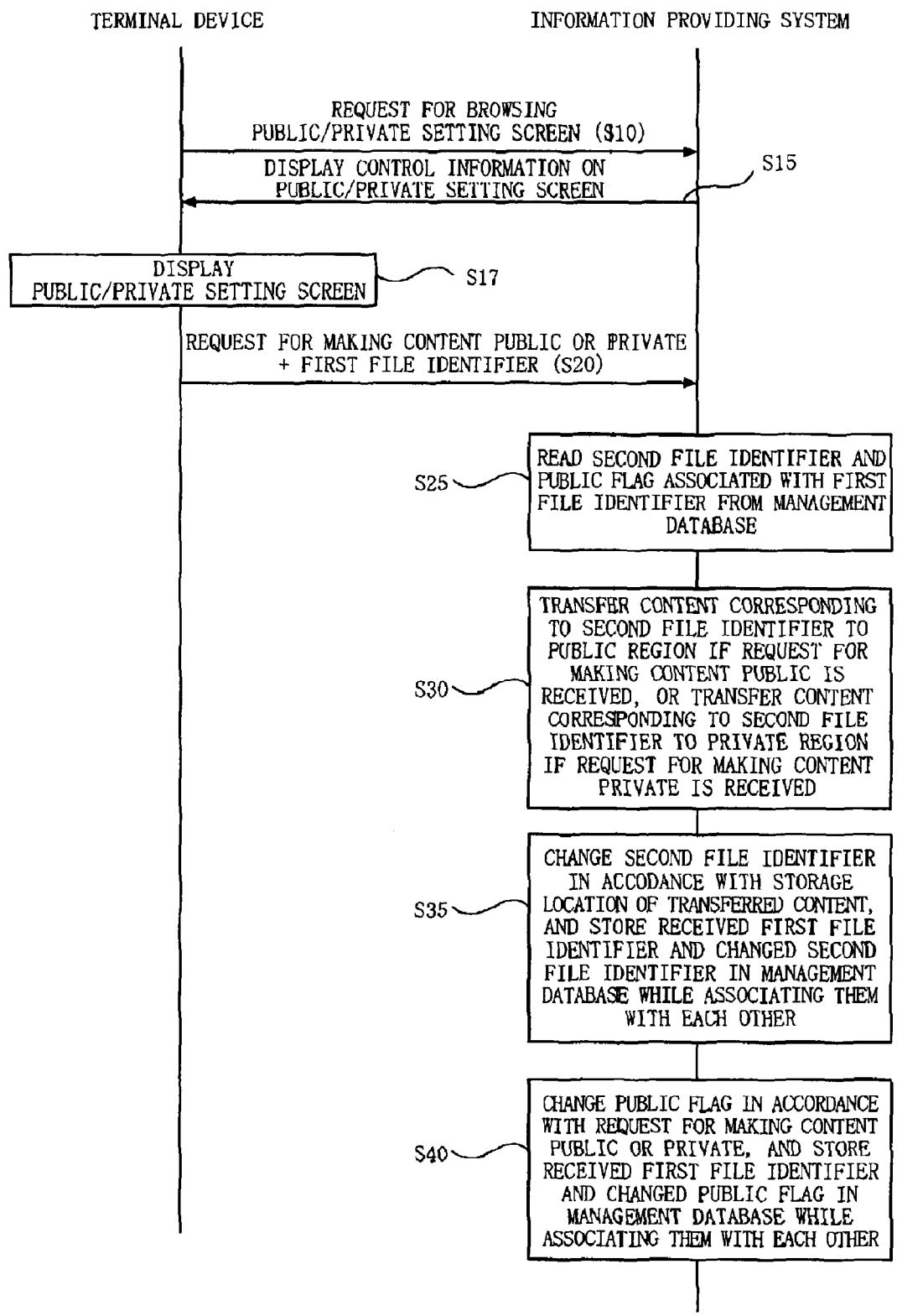
FIG. 6 is a flow chart of the terminal device and the information providing system upon performing setting of making content public or private.
Figures 7, 8:
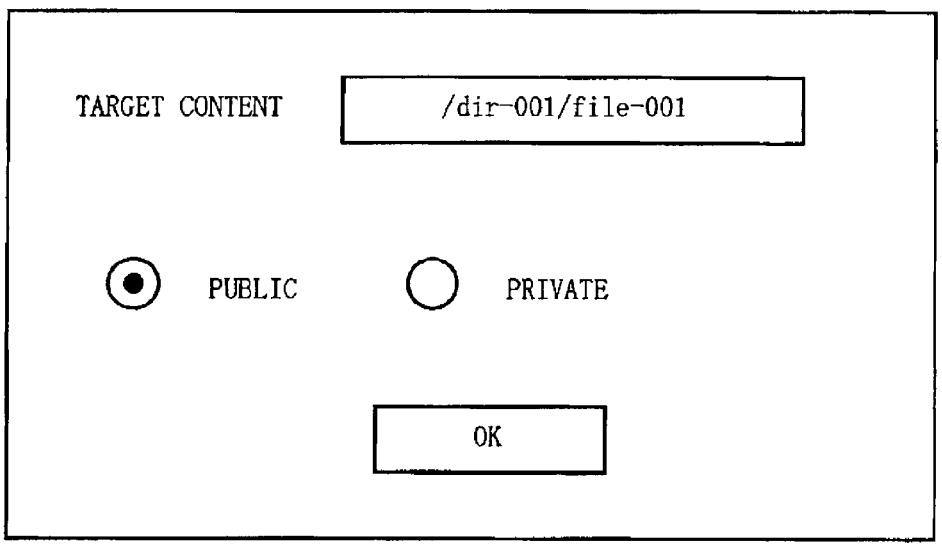
FIG. 7 shows a configuration of an example of a public/private setting screen.
FIG. 8 shows a structure of the management database after setting of making the content public or private has been performed.
Figure 9:
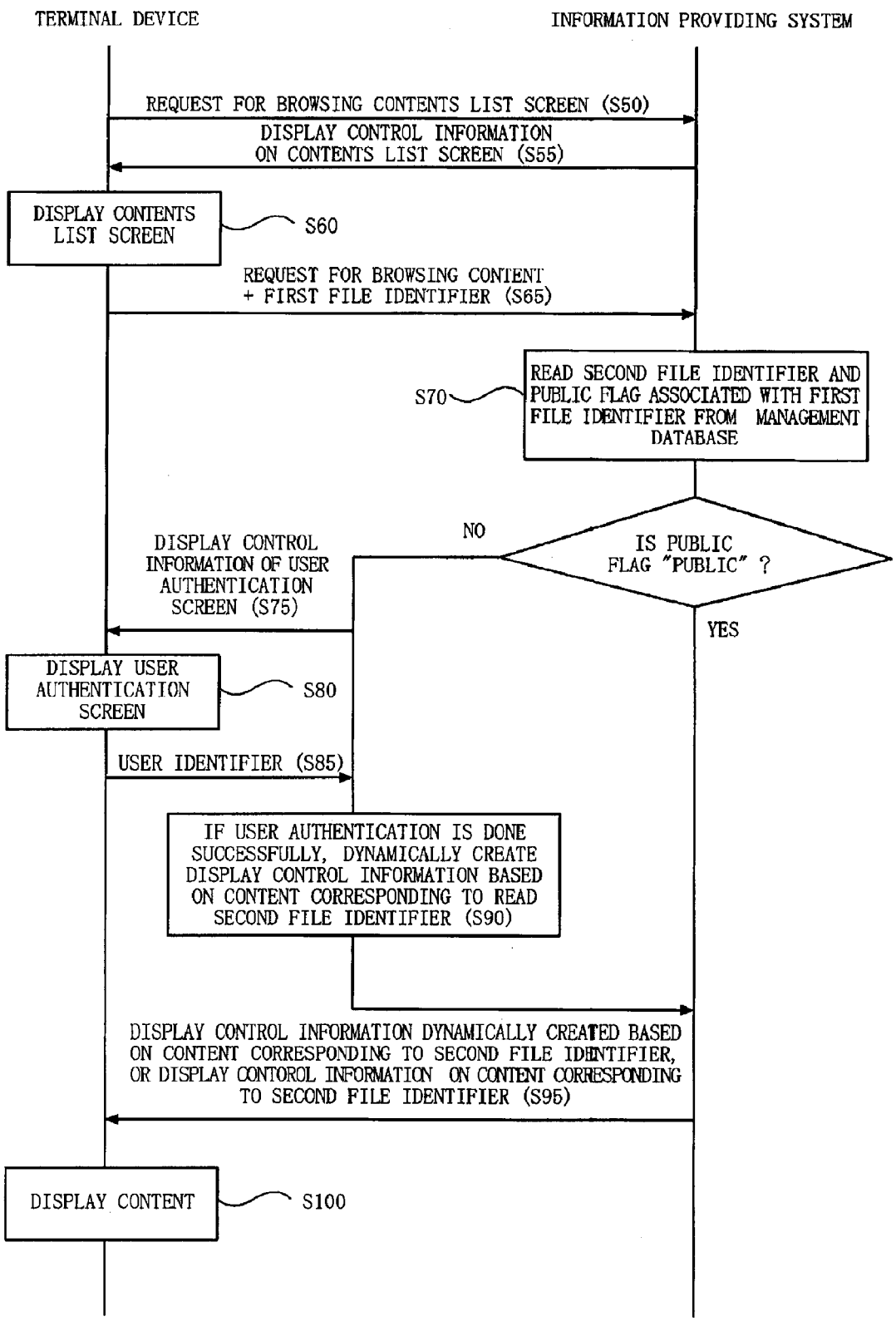
FIG. 9 is a flow chart of the terminal device and the information providing system upon browsing the content.
Figure 10:
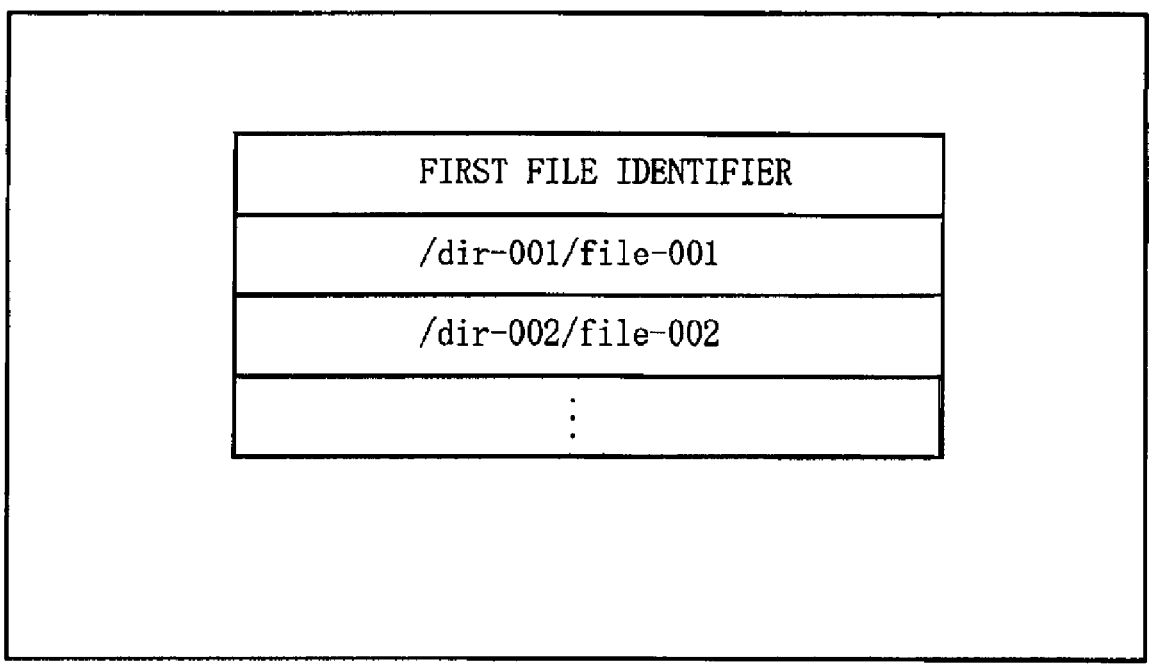
FIG. 10 shows a configuration of an example of a contents list screen.

What is claimed is:

1. A method of making contents public or private for use in a computer system in which an information providing system for providing the contents and a terminal device for browsing the contents are connected to a communication network, the terminal device including a first storage device storing the first file identifier for identifying the contents, the information providing system including a second storage device having a public region accessible from the terminal device and a private region inaccessible from the terminal device, the second storage device storing the contents in the public or private region, and storing the first file identifier for identifying the contents and a second file identifier for identifying the contents while associating them with each other, wherein the first file identifier is stored in both the terminal device and the information providing system, and wherein the second file identifier is only stored in the information providing system, the method comprising:

a) causing the terminal device to transmit a request for making the contents public or private and the first file identifier to the information providing system; and b) causing the information providing system to:
i) receive the request for making the contents public or private and the first file identifier;
ii) read the second file identifier associated with the received first file identifier from the second storage device;
iii) transfer the contents corresponding to the read second file identifier to the public region if the received request is for making the contents public, or transfer the contents corresponding to the read second file identifier to the private region if the received request is for making the contents private; and
iv) after transferring the contents, change the second file identifier based on a storage location of the transferred contents to a third file identifier and store the received first file identifier and the third file identifier in the second storage device while associating them with each other, wherein the first file identifier stored in the terminal device and the information providing system remains unchanged after transferring the contents.

2. The method of claim 1, wherein the second storage device of the information providing system further stores the first file identifier and a public flag for identifying whether the contents are stored in the public or private region while associating them with each other, the method further comprising:

causing the terminal device to transmit a request for browsing the contents and the first file identifier to the information providing system; and causing the information providing system to:
i) receive the request for browsing the contents and the first file identifier;
ii) read the public flag and the second file identifier associated with the received first file identifier from the second storage device;
iii) authenticate a user if the read public flag indicates that the contents are stored in the private region; and
iv) dynamically create display control information based on the contents corresponding to the read second file identifier and transmit the information to the terminal device if the user authentication is done successfully, or transmit the display control information on the contents corresponding to the second file identifier to the terminal device if the read public flag indicates that the contents are stored in the public region;

wherein the terminal device receives the display control information and displays the contents based on the received display control information.

3. An information providing system for providing contents, the information providing system comprising:

a communication device;

a second storage device comprising a public region accessible from an external terminal device and a private region inaccessible from the external terminal device, wherein the second storage device stores contents in the public or private region, and stores a first file identifier for identifying the contents and a second file identifier for identifying the contents while associating them with each other, and wherein the external terminal device includes a first storage device storing the first file identifier for identifying the contents, and wherein the first file identifier is stored in both the external terminal device and the information providing system, and wherein the second file identifier is only stored in the information providing system;

a processor; and a memory device storing instructions which when executed by the processor, cause the processor to:
a) receive a request for making the contents public or private and the first file identifier from the external terminal device via the communication device;
b) read the second file identifier associated with the received first file identifier from the second storage device;
c) transfer the contents corresponding to the read second file identifier to the public region if the received request is for making the contents public, or transfer the contents corresponding to the read second file identifier to the private region if the received request is for making the contents private; and d) after transferring the contents, change the second file identifier based on a storage location of the transferred contents to a third file identifier and store the received first file identifier and the third file identifier in the second storage device while associating them with each other, wherein the first file identifier stored in the external terminal device and the information providing system remains unchanged after transferring the contents.

4. The information providing system of claim 3, wherein:
a) the second storage device further stores the first file identifier and a public flag for identifying whether the contents are stored in the public or private region while associating them with each other; and
b) the instructions, when executed by the processor, cause the processor to:
   i) receive a request for browsing the contents and the first file identifier from the external terminal device via the communication device;
   ii) read the public flag and the second file identifier associated with the received first file identifier from the second storage device;
   iii) authenticate a user if the read public flag indicates that the contents are stored in the private region; and
   iv) dynamically create display control information based on the contents corresponding to the read second file identifier and transmit the information to the terminal device via the communication device if the user authentication is done successfully, or transmit the display control information on the contents corresponding to the second file identifier to the terminal device via the communication device if the read public flag indicates that the contents are stored in the public region.

5. A non-transitory computer readable storage medium storing an information providing program for use in an information providing system, the information providing system including a communication device and a second storage device, the second storage device comprising a public region accessible from an external terminal device and a private region inaccessible from the external terminal device, wherein the second storage device stores contents in the public or private region, and stores a first file identifier for identifying the contents and a second file identifier for identifying the contents while associating them with each other, and wherein the external terminal device includes a first storage device storing the first file identifier for identifying the contents, and wherein the first file identifier is stored in both the external terminal device and the information providing system, and wherein the second file identifier is only stored in the information providing system, the information providing program causing the information providing system to:

a) receive a request for making contents public or private and the first file identifier from the external terminal device via the communication device;
b) read the second file identifier associated with the received first file identifier from the second storage device;
c) transfer the contents corresponding to the read second file identifier to the public region if the received request is for making the contents public, or transfer the contents corresponding to the read second file identifier to the private region if the received request is for making the contents private; and
d) after transferring the contents, change the second file identifier based on the storage location of the transferred contents to a third file identifier and store the received first file identifier and the third file identifier in the second storage device while associating them with each other, wherein the first file identifier stored in the external terminal device and the information providing system remains unchanged after transferring the contents.

6. The non-transitory computer readable storage medium storing of claim 5, wherein the information providing program further causes the information providing system to:
receive the request for browsing the contents and the first file identifier from the external terminal device via the communication device;
read the public flag and the second file identifier associated with the received first file identifier from the second storage device;
authenticate the user if the read public flag indicates that the contents are stored in the private region; and
dynamically create the display control information based on the contents corresponding to the read second file identifier and transmit the information to the terminal device via the communication device if the user authentication is done successfully, or transmit the display control information on the contents corresponding to the second file identifier to the terminal device via the communication device if the read public flag indicates that the contents are stored in the public region.

* * * * *